US010367709B2

(12) United States Patent
Lee et al.

(10) Patent No.: US 10,367,709 B2
(45) Date of Patent: Jul. 30, 2019

(54) METHOD AND APPARATUS FOR ANALYZING SIGNAL DELAY TIME BASED ON CONTROLLER AREA NETWORK BURST ANALYSIS

(71) Applicants:Hyundai Motor Company, Seoul (KR); Kia Motors Corporation, Seoul (KR)

(72) Inventors: Chung Hi Lee, Seoul (KR); Woo Sub Kim, Namyangju-si (KR); Jeong Hwan Kim, Seoul (KR); Yong Woon Cho, Hwaseong-si (KR); Jeong Chan Kim, Seongnam-si (KR); Myung Hyun Koo, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 64 days.

(21) Appl. No.: 15/716,147

(22) Filed: Sep. 26, 2017

(65) Prior Publication Data
US 2018/0152364 A1 May 31, 2018

(30) Foreign Application Priority Data
Nov. 25, 2016 (KR) ........................ 10-2016-0158154

(51) Int. Cl.
*H04L 12/26* (2006.01)
*H04L 12/40* (2006.01)
(52) U.S. Cl.
CPC .......... *H04L 43/0852* (2013.01); *H04L 12/40* (2013.01); *H04L 12/40143* (2013.01); *H04L 2012/40215* (2013.01)

(58) Field of Classification Search
CPC ................ H04L 43/0852; H04L 12/40; H04L 12/40143; H04L 2012/40215
See application file for complete search history.

(56) References Cited

U.S. PATENT DOCUMENTS

| 6,111,888 | A | * | 8/2000 | Green | .................. | H04J 3/0652 |
| | | | | | | 370/447 |
| 6,115,390 | A | * | 9/2000 | Chuah | .................. | H04L 1/1607 |
| | | | | | | 370/348 |

(Continued)

FOREIGN PATENT DOCUMENTS

KR 10-1596753 B1 2/2016

*Primary Examiner* — Sharad Rampuria
(74) *Attorney, Agent, or Firm* — Morgan, Lewis & Bockius LLP

(57) ABSTRACT

A method and apparatus for analyzing a signal delay time based on controller area network (CAN) burst are disclosed. An apparatus for analyzing a signal delay time, connected to a controller area network (CAN) bus includes a measuring device configured to determine a transmission start time based on a receiving time point of a CAN signal and to determine a receiving time interval between the CAN signals that are continuously received, a fixer configured to fix a burst period corresponding to CAN signals with the determined receiving time interval less than a predetermined value, a selector configured to select an analysis target CAN signal in the fixed burst period, and a determiner configured to determine a maximum transmission delay time 'a' corresponding to the selected CAN signal.

17 Claims, 9 Drawing Sheets

(56) References Cited

U.S. PATENT DOCUMENTS

| | | | |
|---|---|---|---|
| 8,504,864 B2* | 8/2013 | Menon | B60T 7/18 370/350 |
| 2008/0118799 A1* | 5/2008 | Matsumoto | H01M 8/04007 706/45 |
| 2016/0173295 A1* | 6/2016 | Hartwich | H04L 43/0852 370/503 |

* cited by examiner

METHOD AND APPARATUS FOR ANALYZING SIGNAL DELAY TIME BASED ON CONTROLLER AREA NETWORK BURST ANALYSIS

CROSS-REFERENCE(S) TO RELATED APPLICATIONS

The present application claims priority to Korean Patent Application No. 10-2016-0158154, filed on Nov. 25, 2016, the entire contents of which is incorporated herein for all purposes by this reference.

BACKGROUND OF THE INVENTION

Field of the Invention

The present invention relates to signal delay time analysis in a controller area network (CAN) communication, and more particularly, to a method and apparatus for analyzing a signal delay time via burst analysis on a CAN bus.

Description of Related Art

A future vehicle includes a plurality of electronic control units (ECUs) that are operatively associated with various detectors disposed inside/outside the vehicle, and performs communications using a network in the vehicle, such as a controller area network (CAN), to intelligently control various functions of the vehicle to enhance user convenience and driving efficiency.

As the number of functions disposed in a vehicle increases, the amount of a CAN data signals are increased, and to the present end, research has been actively conduced into high speed communication technology (CAN-flexible data-rates (CAN-FD)) using a CAN environment.

In particular, there has been a need for analysis of CAN communication data for a more stable and effective high speed data communication. There has also been a need for accurate evaluation and analysis of performance of all communication data buses according to an increase in communication speed and data amount, and, there has been a need for an accurate and effective analysis scheme.

CAN-FD communication retains the same communication mechanism using the same method as CAN communication. When there is a message to be transmitted, a controller connected to a CAN bus may initiate communication via arbitration of priority through a unique identification (ID) of each message. In the present case, CAN-FD may support higher speed (four times) and higher capacity communication (eight times) than conventional CAN communication. Accordingly, an entire bus communication load amount may be cut in third. Accordingly, CAN-FD has been evaluated as a technology for effectively handling an increase in the number controllers and management of a bus load according to applications of autonomous driving technology.

Currently, a bus load measurement method of evaluating bus performance based on the total amount of data transmitted at a random point in time to evaluate performance of a CAN bus has been used. However, the bus load measurement method measures a load using only a transmission amount of an actual message compared with a transmission rate of a bus and, thus, it is disadvantageous in that it is difficult to analyze a delay according to the priority of messages and period concentration which may occur in an actual vehicle.

When instantaneous continuous data, i.e., a burst, is generated according to period concentration, a delay time is generated until a message is received and, thus, the probability of a system error is increased.

To measure a delay time of a message received by controllers disposed in an actual vehicle, there is a need for a change in software or simulation of an internal structure of software of the controllers that transmit/receive the corresponding message. In the case of a software change, a test proceeds according to an actual vehicle environment and, thus, the software of all controllers connected to a corresponding bus needs to be changed and, accordingly, disposition costs and time may be additionally required. There is a problem in that the reliability of a controller is degraded according to a change in software, and it is also difficult to add a logic for measuring delay time due to the use of limited resources.

In the case of a simulation of the internal structure of software, there is a problem in that it is difficult to perfectively embody an actual vehicle environment via simulation, and it is difficult to prove correspondence between a simulation module and an actual vehicle environment.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Accordingly, various aspects of the present invention are directed to a providing method and apparatus for analyzing signal delay time based on controller area network burst analysis that substantially obviates one or more problems due to the limitations and disadvantages of the related art.

Various aspects of the present invention are directed to providing a method and apparatus for analyzing a signal delay time via controller area network (CAN) burst analysis.

Various aspects of the present invention are directed to providing a method and apparatus for analyzing a signal delay time, which does not require a separate change in controller software or simulation of an internal structure of software, and enables the analysis of delay time of a signal using only signal information that is actually measured on a CAN bus.

Additional advantages, objects, and features of the invention will be set forth in part in the description which follows and in part will become apparent to those having ordinary skill in the art upon examination of the following, or may be learned from practice of the invention. The objectives and other advantages of the invention may be realized and attained by the structure particularly pointed out in the written description and claims hereof as well as the appended drawings.

To achieve these objects and other advantages in accordance for the invention, as embodied and broadly described herein, a method and apparatus for analyzing a signal delay time via controller area network (CAN) analysis are provided.

In an aspect of the present invention, a method of analyzing a signal delay time in a controller area network (CAN) communication network connected to a plurality of controllers includes determining a transmission start time of a transmitted signal generated in the controller based on data obtained by measuring a receiving time point of a CAN signal, determining a receiving time interval of the CAN signals that are sequentially received via a communication bus, fixing a burst period corresponding to CAN signals with the determined receiving time interval less than a predetermined reference value, selecting an analysis target CAN signal in the fixed burst period, and determining a maximum transmission delay time 'a' corresponding to the selected CAN signal.

The maximum transmission delay time 'a' may include a delay time in a transmission buffer according to CAN signals with higher priority than the selected CAN signal in the fixed burst period and a transmission time of the selected CAN signal.

The maximum transmission delay time 'a' may further include a delay time according to one CAN signal that has lower priority than the selected CAN signal in the fixed burst period and is being pre-transmitted.

The analysis target CAN signal may be randomly selected.

The analysis target CAN signal may be selected based on the priority allocated to a corresponding CAN signal.

The method may further include checking whether the selected CAN signal is a periodic signal, as a result of the checking, when the selected CAN signal is a periodic signal, determining an average transmission period of the selected CAN signal, and determining a maximum transmission delay time 'b' based on the determined average transmission period.

When a start time point of the average transmission period in a corresponding burst period is after a start time point of the maximum transmission delay time 'a' corresponding to the selected CAN signal, the maximum transmission delay time 'b' may be determined.

When a start time point of the average transmission period in a corresponding burst period is after a start time point of the maximum transmission delay time 'a' corresponding to the selected CAN signal, the start time point of the average transmission period may be fixed as a start time point of the maximum transmission delay time 'b'.

The average transmission period may be determined using a method of least squares.

In another aspect of the present invention, an apparatus for analyzing a signal delay time connected to a controller area network (CAN) bus includes a measuring device configured to determine a transmission start time based on a receiving time point of a CAN signal and to determine a receiving time interval between the CAN signals that are continuously received, a fixer configured to fix a burst period corresponding to CAN signals with the determined receiving time interval less than a predetermined reference value, a selector configured to select an analysis target CAN signal in the fixed burst period, and a determiner configured to determine a maximum transmission delay time 'a' corresponding to the selected CAN signal.

In another aspect of the present invention, a computer readable recording medium may have recorded thereon a program for executing any one of the method of the aforementioned methods of a signal delay time.

The method and apparatuses of the present invention have other features and advantages which will be apparent form or are set forth in more detail in the accompanying drawings, which are incorporated herein, and the following Detailed Description, which together serve to explain certain principles of the present invention.

Figure 1:
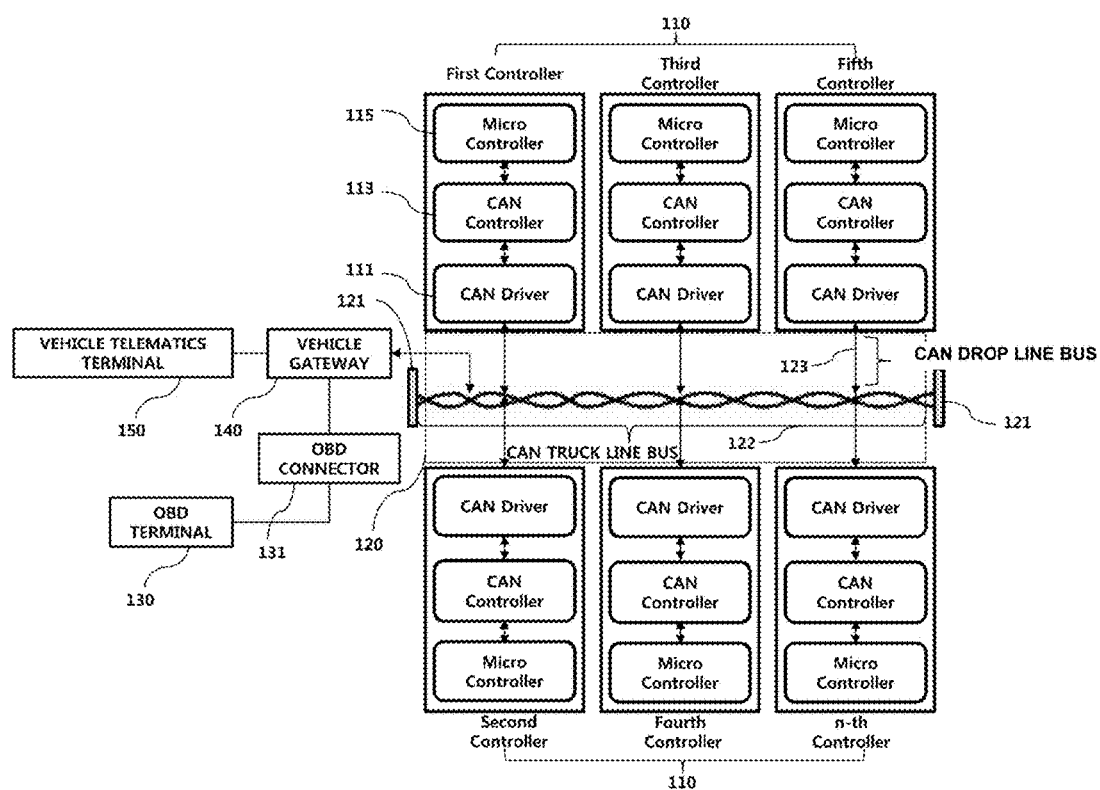
FIG. 1 is a diagram for explanation of a structure of a controller area network (CAN) communication network of a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific orientations, dimensions, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various exemplary embodiments of the present invention(s), examples of which are illustrated in the accompanying drawings are described below. While the invention(s) will be described in conjunction with exemplary embodiments, it will be understood that the present description is not intended to limit the invention(s) to those exemplary embodiments. On the contrary, the invention(s) is intended to cover not only the exemplary embodiments, but also various alternatives, modifications, equivalents and other embodiments, which may be included within the spirit and scope of the invention as defined by the appended claims.

In addition, the suffixes "module" and "unit" of elements herein are used for convenience of description and thus can be used interchangeably and do not have any distinguishable meanings or functions.

Although all elements constituting the embodiments of the present invention are described as integrated into a single one or to be operated as a single one, the present invention is not necessarily limited to such embodiments. According to embodiments, all of the elements may be selectively integrated into one or more and be operated as one or more within the object and the scope of the present invention. Each of the elements may be implemented as independent hardware. Alternatively, some or all of the elements may be selectively combined into a computer program having a program module performing some or all functions combined in one or more pieces of hardware. A plurality of codes and code segments constituting the computer program may be easily understood by those skilled in the art to which the present invention pertains. The computer program may be stored in computer readable media wherein the computer program is read and executed by a computer to implement embodiments of the present invention. Computer program storage media may include magnetic recording media, optical recording media, and carrier wave media.

The term "comprises", "includes", or "has" described herein should be interpreted not to exclude other elements but to further include such other elements since the corresponding elements may be included unless mentioned otherwise. All terms including technical or scientific terms have the same meanings as generally understood by a person having ordinary skill in the art to which the present invention pertains unless mentioned otherwise. Generally used terms, such as terms defined in a dictionary, should be interpreted to coincide with meanings of the related art from the context. Unless differently defined in an exemplary embodiment of the present invention, such terms should not be interpreted in an ideal or excessively formal manner.

It will be understood that, although the terms first, second, A, B, (a), (b), etc. may be used herein to describe various elements of the present invention, these terms are only used to distinguish one element from another element and essential, order, or sequence of corresponding elements are not limited by these terms. It will be understood that when one element is referred to as being "connected to", "coupled to", or "access" another element, one element may be "connected to", "coupled to", or "access" another element via a further element although one element may be directly connected to or directly access another element.

FIG. 1 is a diagram for explanation of a structure of a controller area network (CAN) communication network of a vehicle according to an exemplary embodiment of the present invention.

Referring to FIG. 1, the CAN communication applied to exemplary embodiments of the present invention may broadly include at least one of a vehicle gateway 140, first to $n^{th}$ controllers 110, a CAN bus 120, an On-board Diagnostics (OBD) terminal 130, an OBD connector 131, and a vehicle telematics terminal 150.

In general, in a CAN bus, there is no master for controlling all nodes during access of each node (electronic control unit (ECU)) to the CAN bus to read or write data on the CAN bus. Accordingly, upon preparing to transmit data, each node may check whether preparation for transmission is made on a bus and, then, transmit a CAN frame to a CAN network. The transmitted CAN frame may not include address information on a transmitting node and a receiving node and, instead, each node may classify a frame and receive data through a unique identification (ID) included in the CAN frame. A CAN protocol may be controlled to transmit only one message at a point in time on a bus via priority arbitration of a CAN ID.

In the present case, a transmission request may be received from a higher layer of each controller and an arbitration procedure between transmission delay messages may be performed.

A message that is requested to be transmitted after the arbitration procedure is performed may be delayed until the next arbitration procedure is initiated.

All messages transmitted on the CAN bus may have unique CAN IDs, respectively. In the present regard, as an ID number is lowered, higher priority is applied.

Delay in a CAN communication system may be broadly classified into controller internal delay and bus delay. Here, the controller internal delay may refer to the time taken to perform processing in a controller and the bus delay may refer to a delay according to arbitration.

The vehicle gateway 140 may determine whether a corresponding controller is a safe controller through a procedure for authenticating the controllers 110 connected to each other on the CAN bus. In addition, the vehicle gateway 140 may be connected to the vehicle telematics terminal 150 and the OBD terminal 130 by wire or wirelessly. For example, after connecting the OBD terminal 130 to the OBD connector 131, a user may check state information of the controllers 110 connected to a CAN trunk line bus 122 through a screen on the OBD terminal 130 or monitor various control signals transmitted and received thorough the CAN trunk line bus 122. In addition, the user may check vehicle state information collected by the controllers 110 through the OBD terminal 130. In the present case, state information of the controllers 110, a control signal of the CAN trunk line bus 122, the vehicle state information collected by the controllers 110, etc. may be transmitted to the OBD terminal 130 through the vehicle gateway 140.

As another example, the OBD connector 131 may be connected directly to the CAN trunk line bus 122. In the present case, the OBD terminal 130 may monitor a signal that is directly transmitted and received on the CAN trunk line bus 122 without passing through the vehicle gateway 140, or acquire control state information and vehicle state information from the controllers 110 through a predetermined control command.

The vehicle gateway 140 may collect software version information in controllers, i.e., electronic control units (ECUs) disposed in a vehicle according to a predetermined control signal from the OBD terminal 130 and transmit the collected software version information to the OBD terminal 130. The vehicle gateway 140 may receive a software file for a corresponding controller from the OBD terminal 130 according to a predetermined software update request signal of the OBD terminal 130 and, then, install the software file in the corresponding controller.

The CAN trunk line bus 122 may use twisted pair wires and two lines may be driven according to different signals CAN_HI and CAN_LO. End resistors 121 may be disposed at opposite end portions of the CAN trunk line bus 122. Transmission rate on the CAN trunk line bus 122 may be changed according to bus length, i.e., a length of a trunk line.

The first to $n^{th}$ controllers 110 may be connected to a predetermined CAN joint connector or a CAN hub on the CAN trunk line bus 122 through the CAN drop line bus 123 and, theoretically, the maximum number of controllers to be connected to one CAN network may be 2032. In addition, a plurality of controllers may be connected to one CAN hub through the CAN drop line bus 123.

Hereinafter, with reference to reference numerals 110 to 115, a structure of a controller connected to a general CAN trunk line bus will be described.

The controllers 110 may include a CAN driver 111, a CAN controller 113, and a microcontroller 115.

The CAN driver 111 may be connected to the CAN trunk line bus 122 through the CAN drop line bus 123 and a CAN connector or a CAN hub and may form a physical layer of each controller. The CAN driver 111 may provide a configured for detecting errors of the CAN trunk line bus 122 and managing detection, and a function for transmitting and receiving a message.

The CAN controller 113 may perform a function of transmitting and receiving a CAN protocol message and filtering the message. In addition, the CAN controller 113 may provide an interface function with the microcontroller 115 and a message buffer for control of retransmission.

The microcontroller 115 may include a central processing device (CPU) disposed therein and provide a higher layer protocol and various applications.

Although not illustrated in FIG. 1, a controller may include a predetermined memory for recording priority information, version information of disposed software, detecting information, and so on.

The controllers 110 connected to the CAN trunk line bus 122 may transmit a control signal and data through a CAN frame defined according to standards.

The structure of a CAN frame will be described in detail below with reference to FIG. 2.

Figure 2:
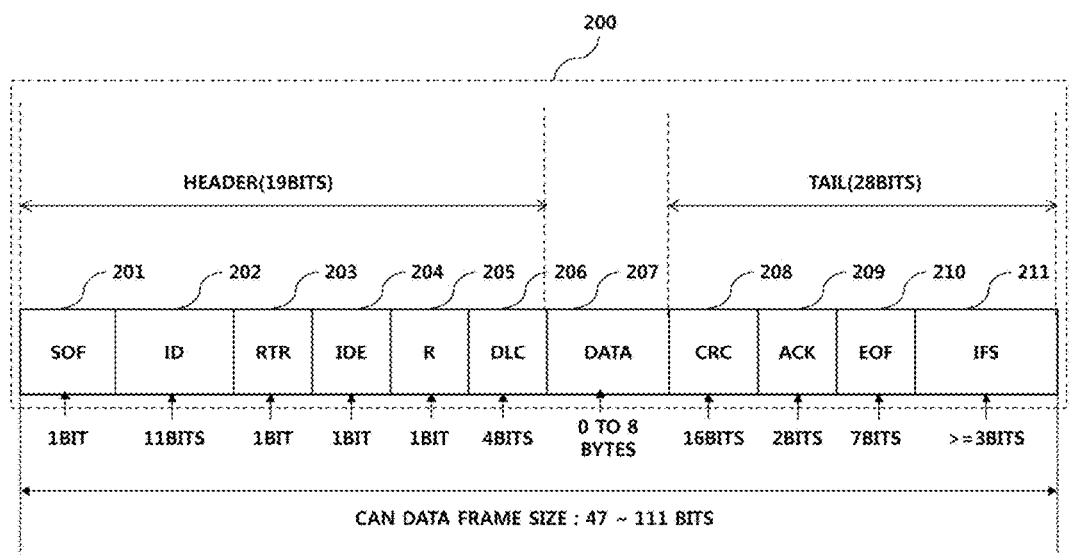
FIG. 2 is a diagram illustrating a structure of a CAN data frame defined according to international standards.

FIG. 2 is a diagram illustrating a structure of a CAN data frame defined according to international standards.

Referring to FIG. 2, a CAN data frame 200 may include a start of frame (SOF) field 201, an identifier (ID) field 202, a remote transmission request (RTR) field 203, an identifier extension (IDE) field 204, a reserved (R) field 205, a data length code (DLC) field 206, a data field 207, a cyclic redundancy check (CRC) field 208, an acknowledgement (ACK) field 209, an end portion of frame (EOF) field 210, and an interframe space (IFS) field 211.

The SOF 201 may be 1-bit long and may be used to indicate start of a corresponding frame.

The ID 202 may be information for identifying a message type and determining priority of a message. In the present example, although a standard CAN data frame format with 11 bits as a length of the ID 202 is illustrated, an extension CAN data frame format with 29 bits as a length of the ID 202 may be defined according to the standard.

The IDE 204 may be used to identify whether a corresponding frame is a standard frame or an extension frame and may be 1-bit long. For example, when a value of the IDE 204 is 0 it may mean a standard frame, and when the value is 1 it may mean an extension frame.

The RTR 203 may be used to identify whether a corresponding frame is a remote frame or a data frame. For example, when a value of the RTR 203 is 0 it may mean a data frame, and when the value is 1 it may mean a remote frame.

The R field 205 may be undefined according to the current standard and reserved for future use, and may be 1-bit long.

The DLC 206 may be code information for identifying a length of data contained in a corresponding frame in a byte device and may be 4 bits long.

The Data 207 may have a variable length of 0 to 8 bytes.

The CRC 208 may include a 15-bit cyclic redundancy check code and a 1-bit backward delimiter and may be used to check whether there is an error in a received frame.

The ACK 209 may be a field used to check whether a receiving end portion normally receives a corresponding frame and may be 2 bits long. All CAN controllers that accurately receive a CAN data frame may transmit an ACK bit positioned at the end portion of a corresponding frame. A transmitting node may check whether there is an ACK bit on a bus, and when the ACK is not discovered the transmitting node may attempt to re-transmit the corresponding frame.

The EOF 210 may be a field used to indicate termination of a corresponding CAN frame and may be 7 bits long.

The IFS 211 may be used to provide time the that is required to process consecutive frames by a CAN controller and to ensure time required to accurately move a received frame to an appropriate position in a message buffer region.

As described above, a CAN data frame may have a variable length of 111 bits from 47 bits. When the Data 207 has a size of 8 bytes, the ratio of the Data 207 to an entire CAN data frame may be 58%.

A CAN communication message may be provided in various types of frames including a data frame, a remote frame, and an error frame.

Hereinafter, a bus load measurement method according to the prior art will be described in detail with reference to FIG. 2.

A CAN communication data transmission load amount, i.e., bus load, may be determined by dividing pure transmission time taken to transmit a message by a transmission period.

The bus load may be determined according to Equation 1 below.

$$\text{Bus load (B\_load)} = \sum_{i=1}^{n} \frac{C_i * T_{bit}}{T_i} \quad \text{(Equation 1)}$$

In Equation 1 above, $C_i$ may refer to a bit number of an $i^{th}$ CAN frame and $T_{bit}$ may refer to a transmission time per bit. $T_i$ may refer to a transmission period of an $i^{th}$ CAN frame.

Here, $C_i$ may be determined as follows.

$C_i$=data transfer bits (variable length)+header and tail bits (47 bits)+stuffing bits count (maximum 24 bits)

Figure 3:
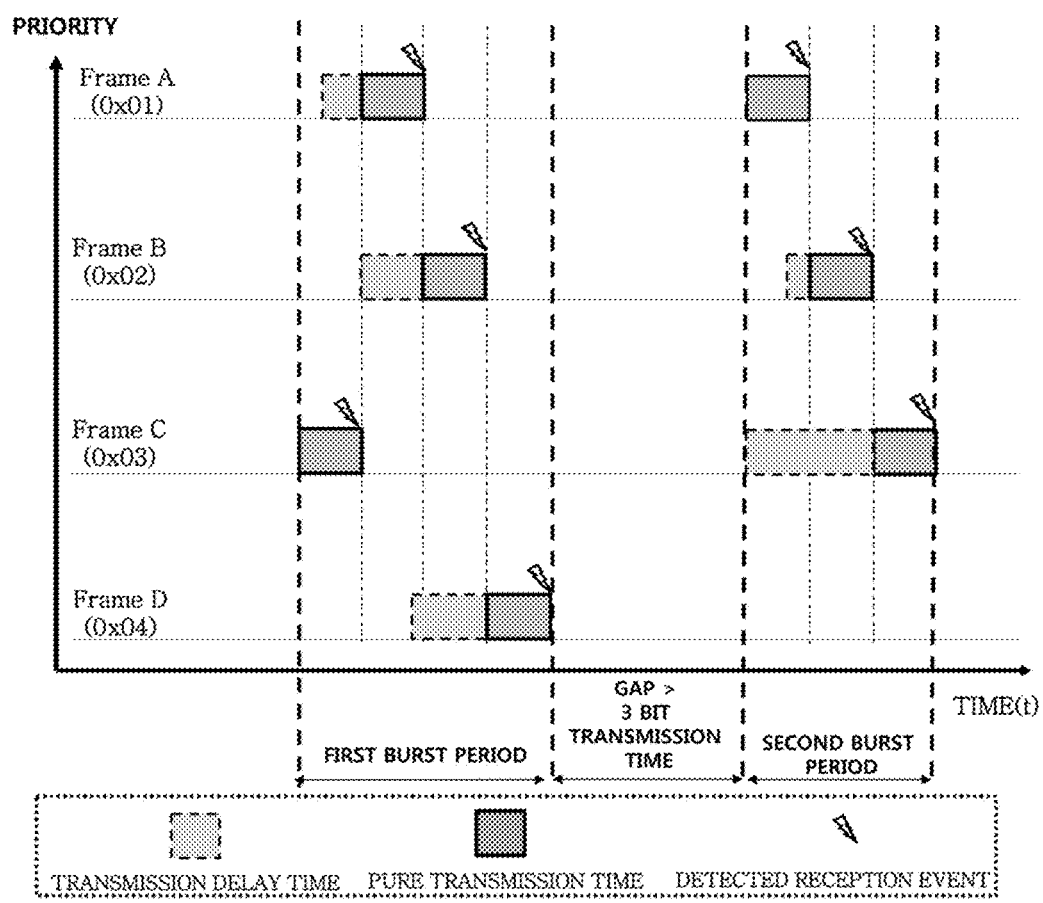
FIG. 3 is a diagram for explanation of a burst analysis method according to an exemplary embodiment of the present invention.

FIG. 3 is a diagram for explanation of a burst analysis method according to an exemplary embodiment of the present invention.

According to an exemplary embodiment of the present invention, burst may refer to a series of message combinations that are consecutively transmitted and received at a time interval less than a predetermined time period.

A burst period may refer to the time in which a series of message combinations are consecutively transmitted or received at a time interval less than a predetermined time period and are present or measured on a bus.

As illustrated in FIG. 3, a predetermined time interval, hereinafter, referred to as a burst gap, may be present in a burst period. For example, the burst gap may be defined as a transmission time of 3 bits or more but is not limited thereto. Here, the transmission time of 3 bits may correspond to 0.6 to 0.7 microseconds (μs) but may not be limited thereto.

A signal is present on a bus based on arbitration in a burst period. For example, as seen from FIG. 3, arbitration may be performed in the order of Frame C, Frame A, Frame B, and Frame D to transmit and receive a signal on a bus in a first burst period.

The length of the burst period may be different according to the number and size of messages transmitted in the corresponding burst period.

A signal delay time analysis apparatus according to an exemplary embodiment of the present invention may determine a burst period of every burst.

The signal delay time analysis apparatus may determine an average transmission period of a specific CAN frame.

The signal delay time analysis apparatus may determine a maximum delay time of a specific CAN frame.

The signal delay time analysis apparatus may determine an average transmission period-based delay time of a specific CAN frame.

A method of determining the maximum delay time and average transmission period-based delay time will be obviously understood with reference to the following drawings.

Figure 4:
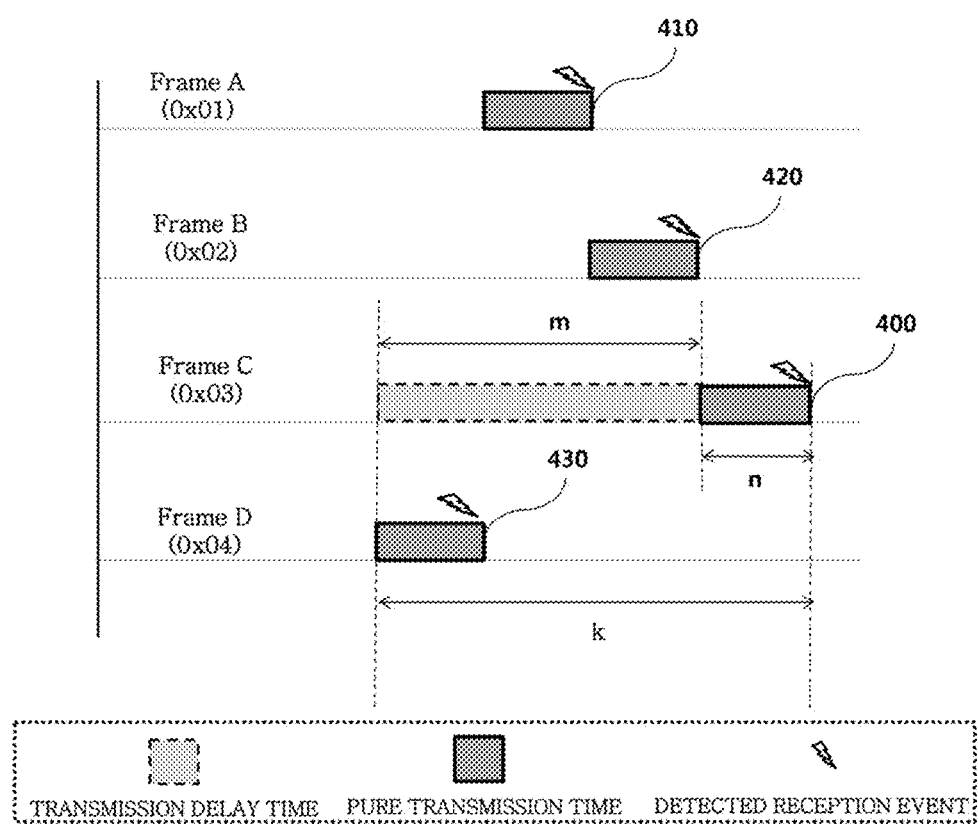
FIG. 4 is a diagram for explanation of a maximum response time analysis method based on burst according to an exemplary embodiment of the present invention.

FIG. 4 is a diagram for explanation of a maximum response time analysis method based on burst according to an exemplary embodiment of the present invention.

In an arbitration procedure for bus occupation, a signal (frame) with low priority may be delayed and may not to be transmitted until all signals (frames) with higher priority than the corresponding signal are transmitted, and another signal may not be transmitted while one signal is transmitted on a bus.

A maximum transmission delay time 'm' may refer to a maximum time when a transmission target frame is delayed in a transmission buffer included in a controller prior to transmission start.

Referring to FIG. 4, the maximum transmission delay time 'm' of Frame C 400 may be determined as the sum of transmission blocking maximum delay time by Frame D 430 with lower priority than Frame C 400 and transmission buffer delay time by Frame A 410 and Frame B 420 with higher priority than Frame C 400.

When a signal with low priority is not present in a corresponding burst period, maximum transmission delay time from the start time of a corresponding burst may be determined.

A maximum response time (worst case response time (WCRT)) 'k' of Frame C may be determined as the sum of the determined maximum transmission delay time 'm' of Frame C and transmission time 'n' of Frame C.

Hereinafter, for convenience of description, a delay time in a buffer, i.e., queue by another CAN frame in a burst period will be referred to as a queuing delay time, and the time taken to transmit an analysis target frame will be referred to as a core transmission time.

Figure 5:
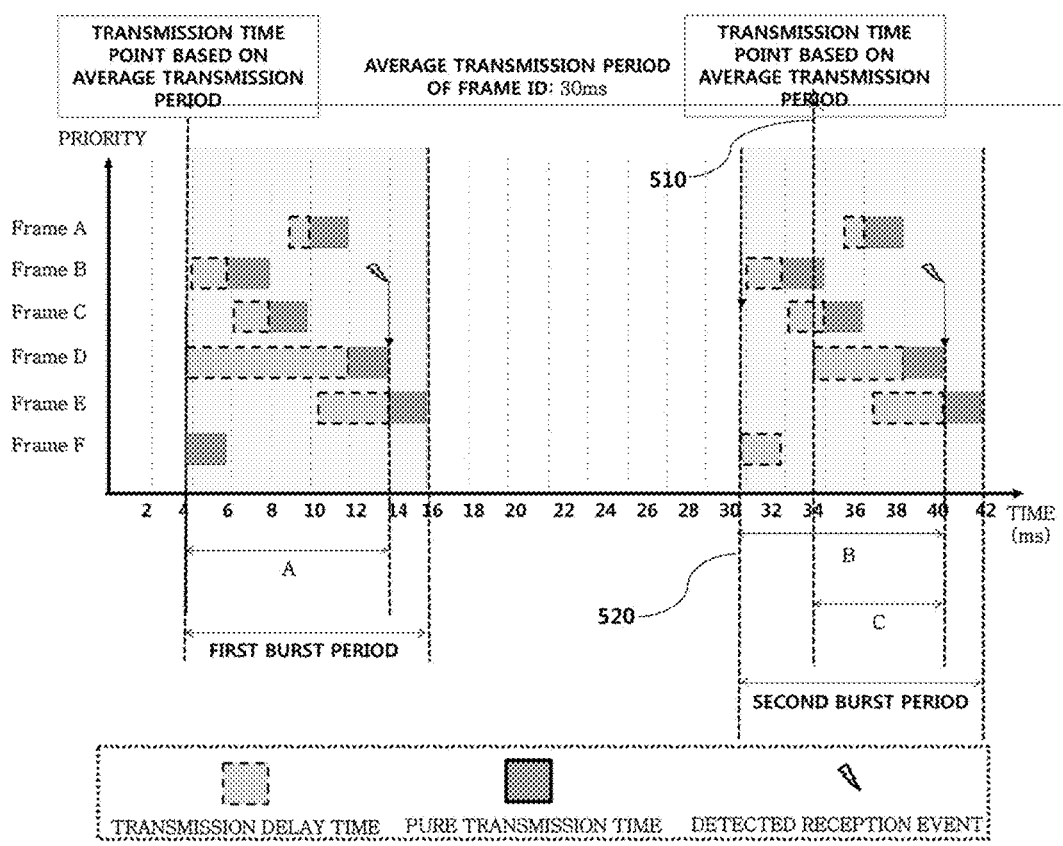
FIG. 5 is a diagram for explanation of a method of determining delay time based on a maximum delay time and an average transmission period according to an exemplary embodiment of the present invention.

FIG. 5 is a diagram for explanation of a method of determining delay time based on a maximum delay time and an average transmission period according to an exemplary embodiment of the present invention.

A signal delay time analysis apparatus according to an exemplary embodiment of the present invention may determine a time interval between CAN frames using a receiving time point of a signal and a transmitting time point determined based on the receiving time point. In the present case, the determined time interval may be compared with a predetermined reference value to fix a burst period.

One of the signals included in the fixed burst period may be selected as an analysis target signal. The present embodiment will be described in terms of an example in which the analysis target signal is Frame D.

Referring to FIG. 5, a maximum delay time corresponding to Frame D in the first burst period may be determined as the sum of the queuing delay time of Frame A, Frame B, and Frame C with higher priority than Frame D and a core transmission time of Frame D.

The signal delay time analysis apparatus may determine an average transmission period of the analysis target signal. As seen from FIG. 5, an average transmission period of Frame D as an analysis target signal is 30 ms.

The signal delay time analysis apparatus may determine a maximum transmission delay time C based on an average transmission period when a start time point 510 of an average transmission period of a second burst period is after a start time point 520 of a maximum transmission delay time B in the corresponding burst period.

Figure 6:
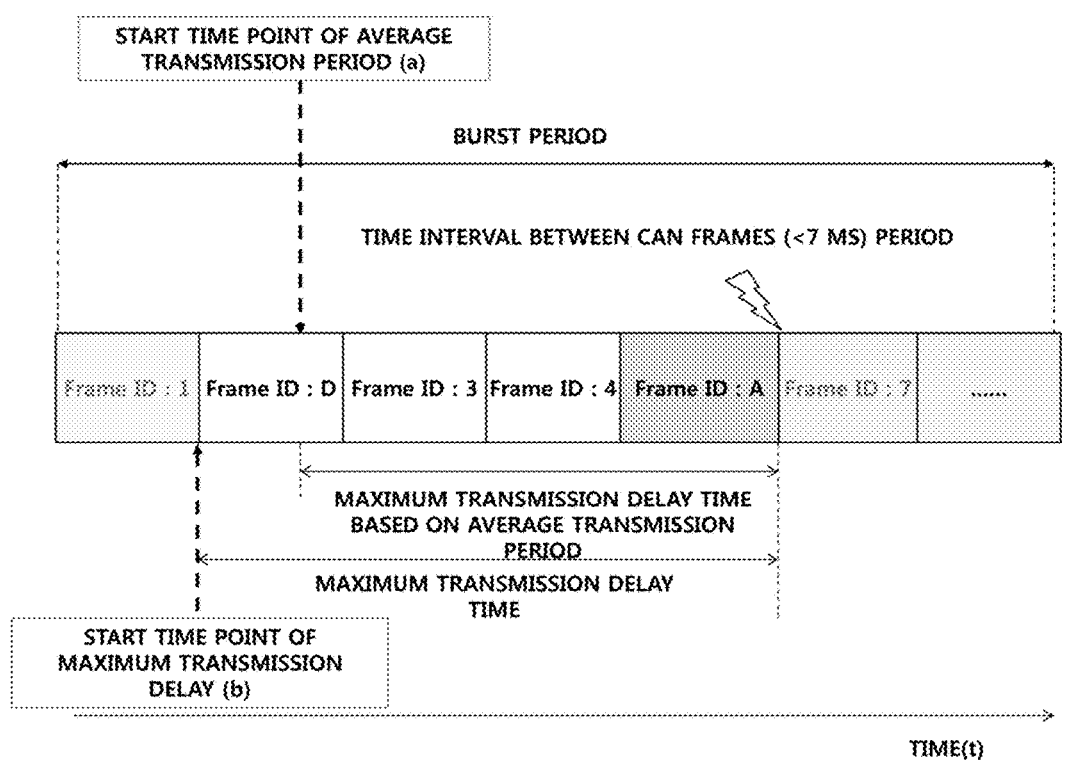
FIG. 6 is a diagram for explanation of a method of determining maximum transmission delay based on an average transmission period according to an exemplary embodiment of the present invention.

FIG. 6 is a diagram for explanation of a method of determining maximum transmission delay based on an average transmission period according to an exemplary embodiment of the present invention.

Referring to FIG. 6, when a burst period is fixed, the signal delay time analysis apparatus may compare an average transmission period start time point 'a' of a signal having A as a Frame ID that is an analysis target signal in the corresponding burst period, and a start time point 'b' of a maximum transmission delay time determined to correspond to the signal having A as a Frame ID.

As the comparison result, when 'a' is antecedent to 'b', the signal delay time analysis apparatus may determine a maximum transmission delay time based on an average transmission period having A as a Frame ID. The maximum transmission delay time determined based on the average transmission period may be advantageously and more accurately determined in consideration of the periodicity of a corresponding signal.

Figure 7:
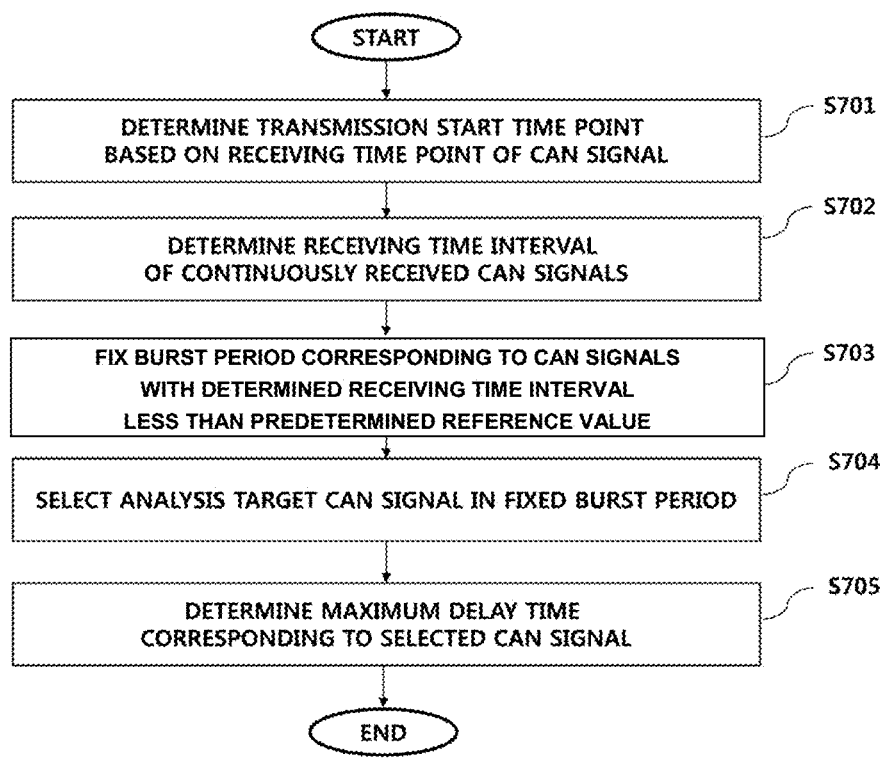
FIG. 7 is a flowchart for explanation of a signal delay time analysis method via CAN burst analysis according to an exemplary embodiment of the present invention.

FIG. 7 is a flowchart for explanation of a signal delay time analysis method via CAN burst analysis according to an exemplary embodiment of the present invention.

Referring to FIG. 7, the signal delay time analysis apparatus may determine a transmission start time point based on a receiving time point of a CAN signal (S701).

The signal delay time analysis apparatus may determine a receiving time interval of continuously received CAN signals (S702).

The signal delay time analysis apparatus may fix a burst period corresponding to CAN signals with the determined receiving time interval less than a predetermined reference value (S703). For example, the burst period may be fixed as signals with a receiving time interval less than 7 microseconds ($\mu s$).

The signal delay time analysis apparatus may select an analysis target CAN signal, i.e., a signal with a specific Frame ID in the fixed burst period (S704).

The signal delay time analysis apparatus may determine a maximum delay time corresponding to the selected CAN signal (S705). Here, a method of determining a maximum delay time may be replaced with the description of the above drawings.

Figure 8:
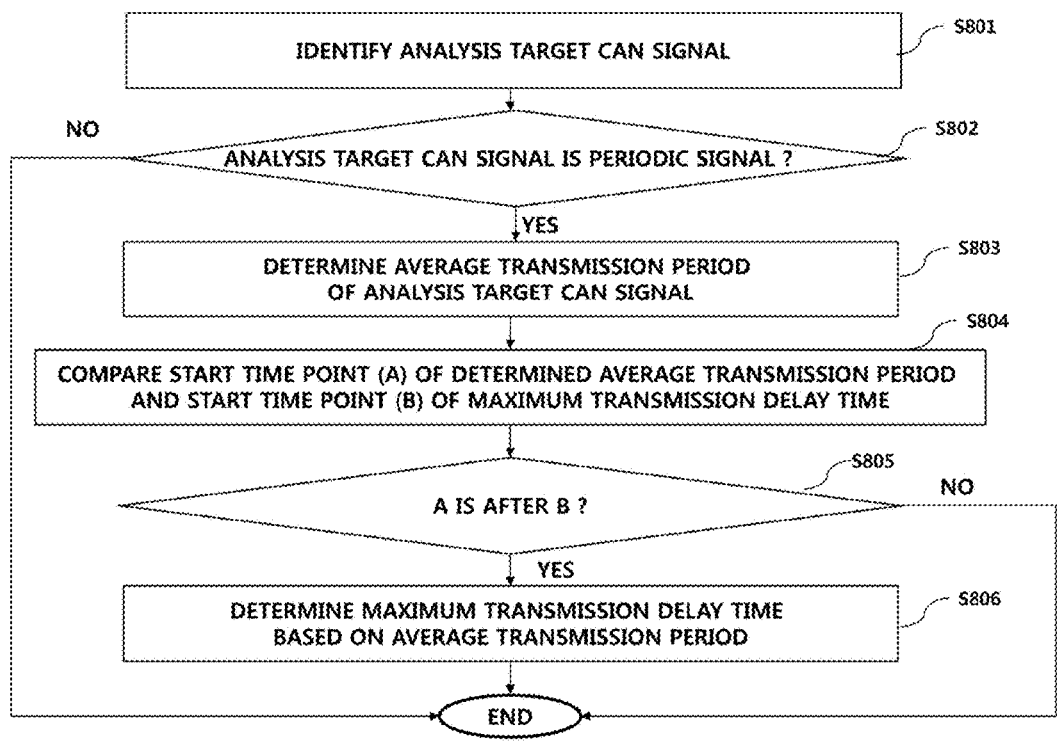
FIG. 8 is a flowchart for explanation of a signal delay time analysis method via CAN burst analysis according to another exemplary embodiment of the present invention.

FIG. 8 is a flowchart for explanation of a signal delay time analysis method via CAN burst analysis according to another exemplary embodiment of the present invention.

Referring to FIG. 8, the signal delay time analysis apparatus may identify the analysis target CAN signal selected operations 701 to 704 of FIG. 7 (S801).

The signal delay time analysis apparatus may check whether the analysis target CAN signal is a periodic signal (S802). Here, the periodicity of a signal may be determined based on a receiving start time point of an analysis target CAN signal measured for each burst period. For example, when a receiving interval between bursts measured with respect to the analysis target CAN signal during a predetermined time period is equal to or less than a predetermined reference value, the corresponding analysis target CAN signal may be determined to be a periodic signal. As another example, the signal delay time analysis apparatus may identify whether a corresponding signal is a periodically generated signal based on an ID of the analysis target CAN signal.

After the check result, when the corresponding signal is a periodic signal, the signal delay time analysis apparatus may determine an average transmission period of the analysis target CAN signal (S803). Here, the average transmission period may be determined using the method of least squares but the present invention is not limited thereto.

The signal delay time analysis apparatus may compare a start time point A of the determined average transmission period and a start time point B of the maximum transmission delay time determined in FIG. 7 (S804).

As the comparison result, when A is after B, the signal delay time analysis apparatus may determine a maximum transmission delay time based on the average transmission period (S805 to S806).

As the check result of operation S802 above, when the analysis target CAN signal is not a periodic signal or, as the comparison result of operation S805 above, when B is after A, the signal delay time analysis apparatus may not determine maximum transmission delay time based on the average transmission period.

The above determined maximum transmission delay time based on the average transmission period may replace the maximum transmission delay time determined in FIG. 7 to be lastly fixed as a maximum transmission delay time corresponding to an analysis target CAN signal.

Figure 9:
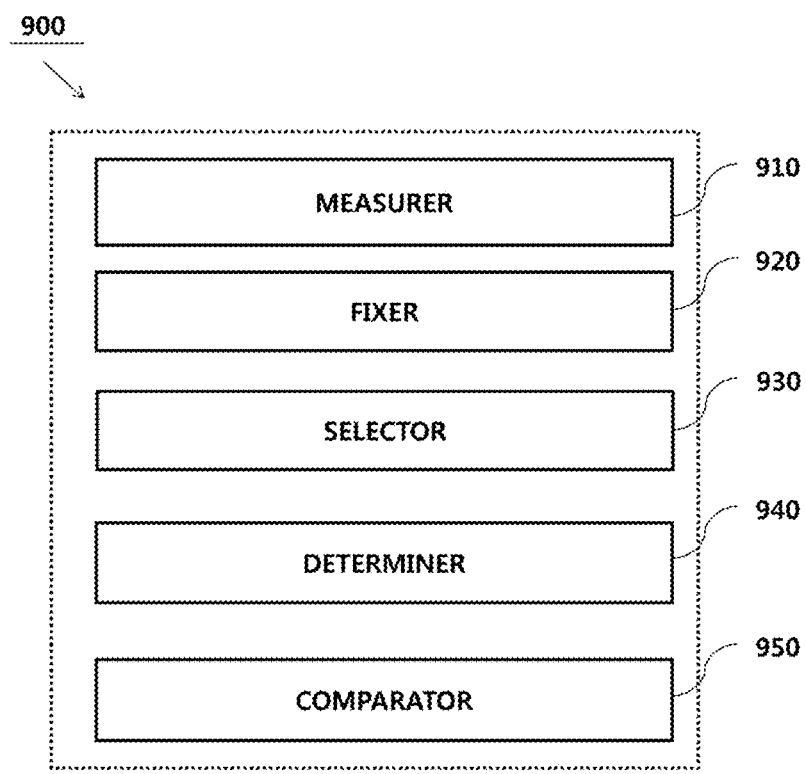
FIG. 9 is a block diagram for explanation of a signal delay time analysis apparatus according to an exemplary embodiment of the present invention.

FIG. 9 is a block diagram for explanation of a signal delay time analysis apparatus 900 according to an exemplary embodiment of the present invention.

Referring to FIG. 9, the signal delay time analysis apparatus 900 may include a measuring device 910, a fixer 920, a selector 930, a determiner 940, and a comparator 950.

The measuring device 910 may be configured to monitor a CAN bus and determine a transmission start time point of a corresponding CAN signal based on a receiving time point of the CAN signal. The measuring device 910 may determine a receiving time interval of continuously received CAN signals.

The fixer 920 may be configured to fix a burst period corresponding to CAN signals with the determined receiving time interval less than a predetermined reference value. For example, the fixer 920 may fix a transmission period of signals with a receiving time interval less than 7 microseconds (μs) but the present invention is not limited thereto, and it may be noted that the reference value may be changed according to the design purpose by one of ordinary skill in the art.

The selector 930 may be configured to select an analysis target CAN signal, i.e., a signal with a specific Frame ID in the fixed burst period. For example, the selector 930 may select the analysis target CAN signal through an external diagnosis device, but this is merely an exemplary embodiment and the analysis target CAN signal may be randomly selected or selected in a predetermined order, e.g., priority of CAN ID.

The determiner 940 may be configured to determine a maximum delay time corresponding to the selected CAN signal. Here, a method of determining the maximum delay time may be replaced with the description of the above drawings.

The measuring device 910 may check whether the analysis target CAN signal is a periodic signal. Here, period of a signal may be determined based on a receiving start time point of the analysis target CAN signal measured for each burst period. For example, when a receiving interval between bursts measured with respect to the analysis target CAN signal for a predetermined time period is equal to or less than a predetermined reference value, the measuring device 910 may determine that the corresponding analysis target CAN signal is a periodic signal. As another example, the measuring device 910 may identify whether a corresponding signal is a periodically generated signal, based on an ID of the analysis target CAN signal.

As the check result, when the corresponding signal is a periodic signal, the determiner 940 may determine an average transmission period of the analysis target CAN signal. Here, the average transmission period may be determined using the method of least squares but the present invention is not limited thereto.

The comparator 950 may be configured to compare the start time point A of the determined average transmission period and the start time point B of the maximum transmission delay time determined in FIG. 7.

As the comparison result, when A is after B, the determiner 940 may determine the maximum transmission delay time based on the average transmission period.

When, as the check result of operation S802 above, the corresponding signal is not a periodic signal or, as the comparison result of operation S805, B is after A, the determiner 940 may not determine the maximum transmission delay time based on the average transmission period.

The method and apparatus according to an exemplary embodiment of the present invention may have the following advantages.

The present invention advantageously provides a method and apparatus for analyzing signal delay time via CAN burst analysis.

The present invention advantageously provides a method and apparatus for analyzing signal delay time, which does not require a separate change in controller software or simulation of an internal structure of software, and enables analysis of delay time of a signal using only signal information that is actually measured on a CAN bus.

Compared with a conventional signal delay time prediction method using a statistical model and a mathematical scheduling analysis model, the present invention advantageously determines signal delay time based on data that is actually measured on a bus to have high accuracy.

The present invention advantageously analyzes signal delay time using actual vehicle data and, thus, additional development according to a vehicle type may not be required.

For convenience in explanation and accurate definition in the appended claims, the terms "upper", "lower", "up", "down", "upwards", "downwards", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing description of specific exemplary embodiments of the present invention has been presented for purposes of illustration and description. They are not intended to be exhaustive or to limit the invention to the precise forms disclosed, and obviously many modifications and variations are possible in light of the above teachings. The exemplary embodiments were chosen and described I order to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of analyzing a signal delay time in a controller area network (CAN) communication network connected to a plurality of controllers, the method comprising:
   determining, by a measuring device, a transmission start time of a transmitted signal generated in the controller based on data obtained by measuring a receiving time point of a CAN signal;
   determining, by the measuring device, a receiving time interval of the CAN signals that are sequentially received via a communication bus;
   fixing, by a fixer, a burst period corresponding to CAN signals with the determined receiving time interval less than a predetermined time value;
   selecting, by a selector, an analysis target CAN signal in the fixed burst period; and
   determining, by a determiner, a maximum transmission delay time 'a' corresponding to the selected CAN signal,
   wherein the maximum transmission delay time 'a' includes a delay time in a transmission buffer according to CAN signals with a higher priority than the selected CAN signal in the fixed burst period and a transmission time of the selected CAN signal.

2. The method according to claim 1, wherein the maximum transmission delay time 'a' further includes a delay time according to one CAN signal that has a lower priority than the selected CAN signal in the fixed burst period and is being pre-transmitted.

3. The method according to claim 1, wherein the analysis target CAN signal is randomly selected.

4. The method according to claim 1, wherein the analysis target CAN signal is selected based on priority allocated to a corresponding CAN signal.

5. The method according to claim 1, further including:
   checking whether the selected CAN signal is a periodic signal;
   as a result of the checking, when the selected CAN signal is the periodic signal, determining an average transmission period of the selected CAN signal; and
   determining a maximum transmission delay time 'b' based on the determined average transmission period.

6. The method according to claim 5, wherein, when a start time point of the average transmission period in a corresponding burst period is after a start time point of the maximum transmission delay time 'a' corresponding to the selected CAN signal, the maximum transmission delay time 'b' is determined.

7. The method according to claim 6, wherein, when the start time point of the average transmission period in the corresponding burst period is after the start time point of the maximum transmission delay time 'a' corresponding to the selected CAN signal, the start time point of the average transmission period is fixed as a start time point of the maximum transmission delay time 'b'.

8. The method according to claim 5, wherein the average transmission period is configured to be determined using a method of least squares.

9. An apparatus for analyzing a signal delay time, connected to a controller area network (CAN) bus, the apparatus including:
   a measuring device configured to determine a transmission start time based on a receiving time point of a CAN signal and to determine a receiving time interval between the CAN signals that are continuously received;
   a fixer configured to fix a burst period corresponding to CAN signals with the determined receiving time interval less than a predetermined time value;
   a selector configured to select an analysis target CAN signal in the fixed burst period; and
   a determiner configured to determine a maximum transmission delay time 'a' corresponding to the selected CAN signal.

10. The apparatus according to claim 9, wherein the maximum transmission delay time 'a' includes a delay time in a transmission buffer according to CAN signals with a higher priority than the selected CAN signal in the fixed burst period and a transmission time of the selected CAN signal.

11. The apparatus according to claim 9, wherein the maximum transmission delay time 'a' further includes a delay time according to one CAN signal with a lower priority than the selected CAN signal in the fixed burst period.

12. The apparatus according to claim 9, wherein the analysis target CAN signal is randomly selected.

13. The apparatus according to claim 9, wherein the analysis target CAN signal is selected based on priority allocated to a corresponding CAN signal.

14. The apparatus according to claim 9, wherein, when the selected CAN signal is a periodic signal, the measuring device is configured to determine an average transmission period of the selected CAN signal and the determiner is configured to determine a maximum transmission delay time 'b' based on the is configured to determine the average transmission period.

15. The apparatus according to claim 14, wherein, when a start time point of the average transmission period in a corresponding burst period is after a start time point of the maximum transmission delay time 'a' corresponding to the selected CAN signal, the determiner determines the maximum transmission delay time 'b'.

16. The apparatus according to claim 15, wherein, when the start time point of the average transmission period in a corresponding burst period is after the start time point of the maximum transmission delay time 'a' corresponding to the selected CAN signal, the start time point of the average transmission period is fixed as a start time point of the maximum transmission delay time 'b'.

17. The apparatus according to claim 14, wherein the average transmission period is configured to be determined using a method of least squares.

* * * * *